March 2, 1937. H. F. WILSON 2,072,783
ELECTROMAGNETIC DEVICE
Filed Aug. 8, 1936
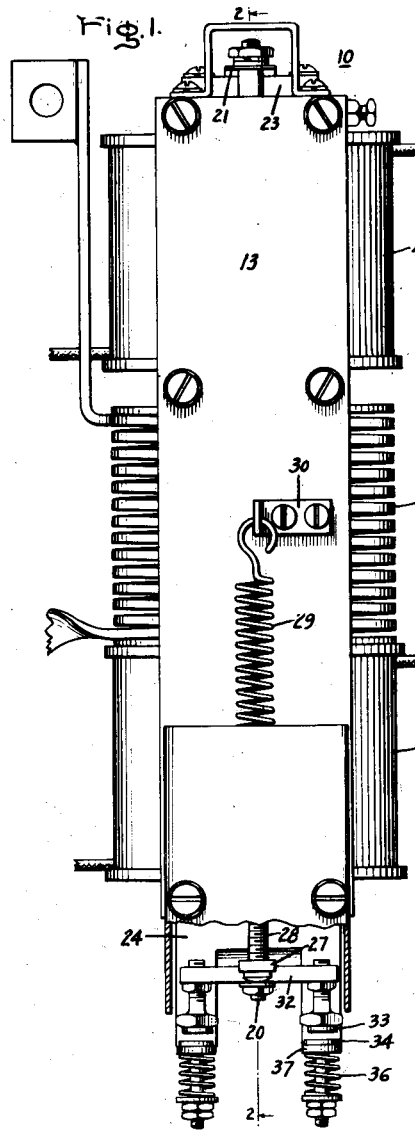
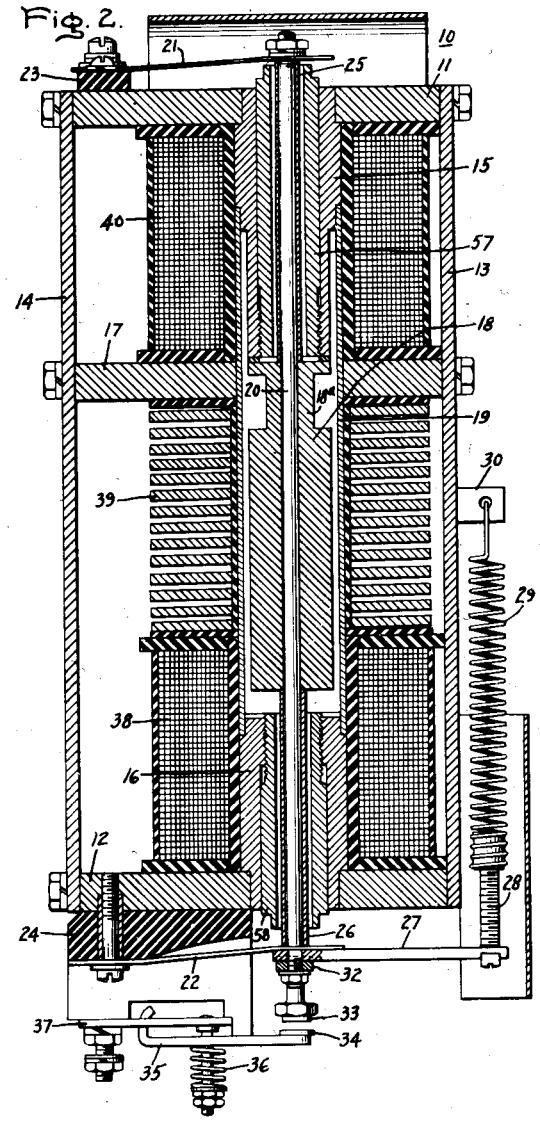
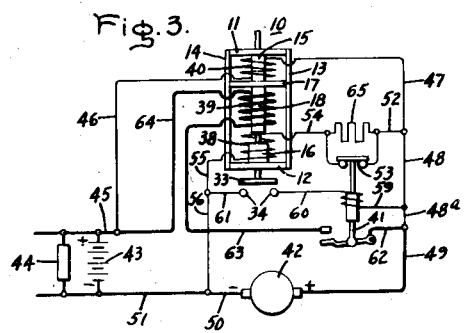
Inventor:
Harold F. Wilson,
by Harry E. Dunham
His Attorney.

Patented Mar. 2, 1937

2,072,783

UNITED STATES PATENT OFFICE 2,072,783

ELECTROMAGNETIC DEVICE

Harold F. Wilson, Erie, Pa., assignor to General Electric Company, a corporation of New York Application August 8, 1936, Serial No. 94,948

7 Claims. (Cl. 171—313)

My invention relates to electromagnetic devices, more particularly to electromagnetic devices for use in systems of electrical distribution wherein a storage battery is arranged to be automatically connected to and disconnected from an intermittently operating, variable speed generator as, for example, in railway car air conditioning or similar systems, and my invention has for an object the provision of a simple, reliable, and inexpensive electromagnetic device of this character.

It has heretofore been proposed in systems of this character to control the connections of the generator and the battery by means of an electromagnetic device having a movable magnetic element, an operating winding energizable in accordance with the generator voltage for operating the magnetic element, and a locking coil energizable in accordance with the difference between the generator voltage and the battery voltage for locking the magnetic element against movement so long as the generator voltage is less than the battery voltage. With such devices, when the generator voltage equals the battery voltage, the locking force exerted by the differential coil is of course substantially zero, and the magnetic element is thereupon operated by the voltage-responsive operating winding to connect the generator in circuit with the battery.

Considerable difficulty has been experienced with devices of this type due to the fact that under certain conditions of operation, the battery voltage may be very low, and consequently, the locking force of the differential winding may go to zero at a low value of generator voltage which is insufficient to effect operation of the movable magnetic element. Upon a further increase in the generator voltage, therefore, the differential winding is energized in a reverse direction so as again to exert on the movable magnetic element a locking force which prevents movement of the magnetic element even though the generator voltage may increase to a relatively high value.

In order to overcome this difficulty, it has been proposed to provide electromagnetic devices of this type with an additional voltage-responsive coil arranged selectively to assist or to buck the holding force of the differential coil, depending upon whether the generator voltage is below or above the battery voltage. Devices provided with this auxiliary voltage coil have been found quite satisfactory, since the electromagnetic device operates to effect connection of the generator to the battery as soon as the generator voltage exceeds the battery voltage by a predetermined amount, regardless of the value of the battery voltage.

It will be apparent, however, that the provision of an additional voltage winding adds considerably to the cost and to the size of the electromagnetic device. Accordingly, it is a further object of my invention to provide an electromagnetic device of this character which is provided with only one generator-voltage-responsive coil and which reliably operates to effect connection of the generator to the battery whenever the generator voltage exceeds the battery voltage by a predetermined amount, regardless of the value of the battery voltage.

In carrying out my invention in one form, I provide, in a system including a generator, a battery and a normally open switch for connecting the generator to the battery, electromagnetic means for effecting closure of the switch comprising a magnetizable frame having opposed pole pieces and a magnetizable core biased to engage one of the pole pieces. The movable core is arranged to effect closure of the switch upon movement toward the other pole piece, and a single generator-voltage-responsive winding is arranged on the magnetizable frame, the frame and the core being so proportioned and arranged that the magnetic flux produced therein by the voltage winding exerts opposing magnetic forces on the core. One of these magnetic forces normally predominates and maintains the core in its normal position, engaging the one pole piece, while the other magnetic force tends to operate the core toward the other pole piece. Also arranged on the magnetizable frame, is a differential winding which produces a magnetic flux proportional to the difference between the generator voltage and the battery voltage.

So long as the battery voltage exceeds the generator voltage, this differential magnetic flux assists the holding magnetic force provided by the generator-voltage coil, and accordingly, operation of the movable core is prevented. As soon as the generator voltage attains a value which exceeds the battery voltage, however, the differential flux is reversed and opposes the holding force. Accordingly, the core is moved by the magnetic operating force to effect closure of the switch whenever the generator voltage exceeds the battery voltage by a predetermined amount. In addition, the magnetizable frame is provided with a series winding energizable upon closure of the switch, which winding assists the voltage winding in holding the core in its operated position so long as the generator voltage exceeds the battery voltage and which exerts a force in opposition to the operating force exerted by the voltage winding to effect return movement of the core to open the switch upon a reversal of the current flow between the generator and the battery due, for example, to a decrease in the generator voltage to a value less than the battery voltage.

More particularly, my improved electromagnetic means comprises a relay for controlling the energization of a load controlling switch or contactor, and the magnetizable frame and core are so arranged that when the core is once operated to its normal position to open the relay contacts upon the flow of a reverse current, the magnetic flux provided by the series winding is effective positively to hold the core in this position even though the reverse current reaches a high value during the time interval required for the contactor to open.

For a more complete understanding of my invention, reference should now be had to the drawing in which Fig. 1 is an elevational side view of an electromagnetic device embodying my invention; Fig. 2 is a sectional view taken along the line 2—2 of Fig. 1; and Fig. 3 is a circuit diagram illustrating the manner in which my electromagnetic device may be connected in an electrical system of distribution.

Referring now to the drawing, I have shown my invention as embodied in an electromagnetic device 10 comprising a substantially rectangular magnetizable frame which includes a pair of magnetizable end plates 11 and 12 connected together by magnetizable side members 13 and 14, the end plates 11 and 12 being provided with inwardly extending pole pieces 15 and 16 respectively. Intermediate the end plates 11 and 12, I provide a magnetizable cross member 17 which is supported at its opposite ends by the side members 13 and 14 respectively and which is provided, as shown, with an aperture in alignment with the pole pieces 15 and 16.

Disposed within the aperture in the cross member 17 for movement between the opposed pole pieces 15 and 16, I provide a magnetizable core or plunger 18, the length of which is so related to the distance between the pole pieces 15 and 16 that an air gap is provided between one end of the core and one of the pole pieces when the opposite end of the core abuttingly engages the opposite pole piece. Likewise, the external diameter of the core 18 is so related to the diameter of the aperture in the cross member 17 that an air gap is provided between the cross member 17 and the core 18. As shown the core 18 is provided with a portion 18a of reduced diameter, the purpose of which will be fully described hereinafter. Surrounding the core 18, is a tubular member 19 formed of brass or other suitable non-magnetic material, the opposite ends of which engage suitable shoulders in the pole pieces 15 and 16. This tubular member 19 forms a support for the energizing windings of my electromagnetic device, which windings will be more particularly referred to hereinafter.

As shown, the movable core 18 is mounted on an operating rod 20, the opposite ends of which extend through aligned apertures in the pole pieces 15 and 16, the extending ends of the rod 20 being resiliently supported for longitudinal movement on leaf springs 21 and 22 which extend outwardly from suitable insulating supports 23 and 24 respectively mounted on the upper and lower end plates 11 and 12. Interposed between the leaf spring 21 and the upper end of the core 18, I provide a spacing member 25 which serves to position the core 18 on the operating rod 20, a similar spacing member 26 being provided between the leaf spring 22 and the lower end of the core 18.

Extending outwardly from the lower end of the operating rod 20, is a rigid arm 27, the outer end of which is provided with an adjustable member 28 arranged to engage a biasing spring 29 supported on an ear 30 extending outwardly from the side member 13 of the magnetizable frame. It will be apparent that the operating rod 20 and the movable core 18 are normally biased by the leaf springs 21 and 22 and by the adjustable spring 29 to the position shown in the drawing, in which position the upper end of the core 18 abuttingly engages the pole piece 15.

Also supported on the lower end of the operating rod 20 at substantially right angles to the arm 27, is a conducting or bridging member 32, the opposite outer ends of which support suitable contact members 33 for movement into and out of engagement with cooperating contact members 34. As shown in Fig. 2, each of the cooperating contact members 34 is resiliently supported by means of a pivoted conducting arm 35 and a spring 36 on a conducting terminal member 37 which is secured to one leg of the insulating member 24, which insulating member is bifurcated, as shown in Fig. 1. It will thus be apparent that when the movable core 18 is operated from the position shown in Fig. 2 into engagement with the pole piece 16, the movable contacts 33 will be operated to engage the cooperating contacts 34.

In order to operate the core 18 so as to effect opening and closing movement of the contacts 33 and 34 in response to predetermined conditions, my electromagnetic device is provided with a generator-voltage-responsive winding 38 which is arranged immediately above the lower end plate 12 surrounding the air gap between the core 18 and the lower pole piece 16; with a series winding 39 which comprises a few turns of heavy conductor and which is arranged immediately above the voltage winding 39 and below the cross piece 17; and with a differential winding 40 which is arranged between the cross member 17 and the upper end plate 11 and surrounds the upper pole piece 15.

With the foregoing description of the constructional features of my improved electromagnetic device in mind, it is believed that a complete understanding of my invention may now be had from a description of the operation of the device in connection with a distribution system including a battery and an intermittently operated variable speed generator. In Fig. 3, I have shown such a system of distribution in which the device 10 is arranged to control the energization of an electroresponsive switch or load controlling contactor 41 which controls the connections of a generator 42 relative to a battery 43 arranged to supply a suitable load circuit indicated by the reference numeral 44, the respective polarities of the generator and the battery being indicated by conventional symbols. It will be understood of course that the generator is provided with a suitable exciting field winding (not shown), and is arranged for intermittent operation. For example, the generator may be driven in accordance with the speed of a vehicle or a car, in which case the load circuit 44 may comprise suitable air conditioning apparatus or the like. Inasmuch as systems of this type are well known in the art, it is not believed necessary to illustrate the additional voltage controlling and protective apparatus usually provided.

In Fig. 3, the electromagnetic device 10 and the load controlling contactor 41 are shown in the normal positions assumed whenever the generator 42 is at a standstill or whenever the generator voltage is less than the battery voltage. Under these conditions, the movable plunger 18 is biased to its uppermost position in which it engages the pole piece 15, and accordingly, the load controlling contactor 41 is deenergized. Furthermore, it will be apparent that since the battery voltage exceeds the generator voltage under these conditions, a small current will flow from the positive terminal of the battery through the conductors 45 and 46, the differential winding 40, the conductors 47, 48, 48a and 49, the armature of the generator 42, and by way of the conductors 50 and 51 to the negative terminal of the battery. The magnetic flux produced by this current flowing through the differential coil 40 flows downwardly in the pole piece 15 through the upper part of the plunger 18, across the air gap between the plunger and the cross member 17, outwardly in the cross member 17, upwardly through the side members 13 and 14, and inwardly through the end plate 11 to the pole piece. Accordingly, a magnetic force is exerted on the core 18 which seals the core in its normal biased position and effectively prevents accidental operation of the electromagnetic device due to shocks or jars.

It will now be assumed that the generator 42 begins to rotate so as to build up a voltage in the direction indicated by the conventional symbols. As the generator voltage builds up, the voltage-responsive winding 38 is energized, the current through this winding flowing from the positive terminal of the generator 42 through the conductors 49, 48a, 48 and 52, suitable interlock contacts 53 on the contactor 41, the conductor 54, the winding 38, and by way of the conductors 55, 56 and 50 to the negative terminal of the generator. Due to this flow of current through the voltage winding 38, a magnetic flux is produced across the air gap between the lower end of the plunger 18 and the pole piece 16, which tends to move the plunger downwardly from its normal biased position. At the same time, however, this magnetic flux assists the flux produced by the differential coil in holding the plunger 18 in engagement with the pole piece 15. As heretofore indicated, the force of the holding flux predominates so long as the generator voltage is less than the battery voltage, and accordingly, the movable plunger 18 is maintained in its normal position.

The magnetic flux produced by the voltage winding 38 flows downwardly through the pole piece 16, outwardly through the bottom end plate 12, and upwardly through the side plates 13 and 14 to the cross member 17. At this point, the magnetic flux divides, a portion of the flux flowing inwardly through the cross member 17, across the air gap between the cross member 17 and the plunger 18, and downwardly through the core 18 and across the air gap to the pole piece 16, and the remainder of the flux flowing through the upper portion of the side plates 13 and 14 inwardly through the upper end plate 11 and downwardly through the pole piece 15 and the core 18 to the air gap between the core and the pole piece 16. It will be observed that the portion of the flux flowing inwardly through the cross member 17 flows in a magnetic circuit which includes two air gaps, i. e. the gap between the cross member 17 and the plunger 18 and the gap between the plunger 18 and the pole piece 16. Accordingly, this magnetic circuit has a relatively high reluctance, and the major portion of the flux produced by the voltage winding 38 flows through the previously traced magnetic circuit which includes the pole piece 15. Furthermore, it will be remembered that the magnetic flux produced by the differential winding tends to flow outwardly in the cross member 17 and further increases the effective reluctance of the previously traced magnetic circuit to a flux tending to flow inwardly in the cross member 17. Accordingly, substantially all of the magnetic flux produced by the voltage winding 38 flows through the pole piece 15 and assists in sealing the movable plunger 18 thereto.

As the generator voltage increases, the flux across the air gap between the plunger 18 and the pole piece 16 increases, and accordingly, a greater force is exerted on the plunger 18, tending to operate the plunger from its normal position. At the same time, however, the increasing flux produced by the voltage winding 38 provides an increasing force, tending to hold the plunger 18 in its normal position. It will be apparent, however, that the increase in the holding force is not as great as the increase in the operating force, since the energization of the differential winding 40 decreases as the generator voltage approaches the battery voltage.

When the generator voltage is equal to the battery voltage, the energization of the differential winding 40 is zero, and accordingly, the only magnetic forces exerted on the plunger 18 are the forces produced by the voltage winding 38. Due to the fact that the core 18 is magnetically sealed in engagement with the pole piece 15, however, the plunger 18 will be retained in its normal position even though a portion of the flux produced by the voltage winding 38 now flows inwardly through the cross member 17 and by-passes the pole piece 15. If desired, the electromagnetic device may of course be designed so that the plunger 18 will move toward the pole piece 16 when the generator voltage equals the battery voltage. This may be accomplished by adjusting the bias of the spring 29 and by varying the air gaps between the plunger 18 and the pole pieces 15 and 16, adjustable inserts 57 and 58 (Fig. 2) being provided in the pole pieces 15 and 16 respectively for this purpose.

In accordance with the preferred operation of my electromagnetic device, however, the various parts are so adjusted that the plunger 18 will be maintained in its normal position until the generator voltage exceeds the battery voltage by a predetermined amount. As soon as the generator voltage begins to exceed the battery voltage, the flow of current through the differential coil 40 is reversed, and accordingly, this coil produces a magnetic flux which tends to flow upwardly in the pole piece 15, outwardly in the end plate 11, downwardly in the side plates 13 and 14, inwardly through the cross member 17, and across the air gap, and upwardly through the plunger 18. This flux is, of course, directly in opposition to the portion of the magnetic flux produced by the voltage winding 38 which flows through the pole piece 15, and accordingly, the effective flux flowing through the pole piece 15 is greatly decreased. As soon as the magnetic flux flowing through the pole piece 15 decreases to a predetermined value, the operating force exerted on the plunger 18, which force increases as the generator voltage increases, becomes effective to move the core 18 toward the pole piece 16 and to close the contacts 33 and 34. Consequent to closure of the contacts 33 and 34, an energizing circuit for the load controlling contactor 41 is established, which circuit extends from the positive terminal of the generator through the conductors 49, 48a and 59, the energizing winding of the contactor 41, the conductor 60, the contacts 33 and 34 of the device 10, and by way of the conductors 61, 56 and 50 to the negative terminal of the generator.

As soon as the load controlling contactor 41 closes, the generator begins to supply current to the battery and the load circuit 44 and since the generator voltage is greater than the battery voltage, this current flow from the positive terminal of the generator through the conductors 49 and 62, the contactor 41, the conductor 63, the series winding 39, the conductor 64, through the battery 43 and the load circuit 44 in multiple, and by way of the conductors 51 and 50 to the negative terminal of the generator. So long as the generator voltage exceeds the battery voltage, the load current flows in this direction and the magnetic flux produced by the series winding 39 is in the same direction as the magnetic flux produced by the voltage winding 38 so that the series winding 39 assists the voltage winding 38 in maintaining the core 18 in its operated or closed circuit position.

Upon operation of the contactor 41 to its closed position the interlock contacts 53 are opened and a resistance 65 is thereby inserted in the energizing circuit of the voltage winding 38. Accordingly, the energization of this winding is decreased so as to increase the sensitivity of the relay 10 to reversals of current in the series winding 39, as will be more fully described hereinafter.

It will now be assumed that the generator voltage drops below the battery voltage due to a change in speed of the generator, or for any other reason, and it will be apparent that the direction of current flow in the series winding 39 will immediately be reversed, current now flowing from the positive terminal of the battery 43 to the positive terminal of the generator 42. Consequently, the magnetic flux produced by the series winding 39 is reversed and opposes the magnetic flux produced by the voltage winding 38. As a result, the force tending to hold the plunger 18 in its operated position decreases, and the plunger 18 returns to its normal position in accordance with its bias, thereby opening the contacts 33 and 34 and deenergizing the load circuit controlling contactor 41 to disconnect the generator from the battery. This operation of the plunger 18 to its normal position occurs in response to reverse currents of very small magnitude, because the holding flux produced by the voltage winding 38 is reduced by the insertion of the resistance 65 in the energizing circuit thereof.

Operation of the contactor 41 to its open circuit position of course deenergizes the series winding 39, and short circuits the resistance 65, and the plunger 18 is thereafter held in its normal position by the differential winding 40 and the voltage winding 38, as hereinbefore described. If the generator voltage now increases to a value which exceeds the battery voltage by a predetermined amount, the device 10 will again operate to energize the contactor 41 and connect the generator to the battery, as described above. Thus it will be seen that my improved electromagnetic device 10 operates automatically to connect and to disconnect the generator and the battery in accordance with the relative values of the generator voltage and the battery voltage.

As will be understood by those skilled in the art, a considerable time interval may elapse between the opening of the contacts 33 and 34 and the opening of the contacts of the load circuit controlling contactor 41, due to the inherent, slow-acting characteristic of load circuit controlling contactors capable of handling large currents. During this interval, the reverse current flowing through the series winding 39 may reach a high enough value so that the magnetic flux produced thereby will entirely overcome the flux produced by the voltage coil 38. In devices heretofore used, difficulty has been encountered due to the fact that such large values of reverse current would reenergize the electromagnetic device and effect reclosure of the contacts and reenergization of the load circuit controlling contactor thereby permitting reverse currents of dangerous magnitudes to flow through the generator. In my improved device, however, the series winding 39 is effective under such conditions positively to assist the biasing means in moving the plunger 18 upwardly regardless of the magnitude of the reverse current. As soon as the holding flux of the voltage winding 38 is overcome, the winding 39 exerts a centering action on the plunger 18, i. e. the plunger 18 tends to move to a position in which the magnetizable material of the plunger is equally distributed relative to the winding 39. Due to the reduced section 18a of the plunger, this centering action causes the plunger to move upwardly so as to open the relay. The plunger 18 thus engages the core 15 and in addition to the centering action, the flux from the winding 39 serves magnetically to seal the core in its open position until the contactor 41 has opened.

Although I have shown my electromagnetic device as a separate relay for controlling the load circuit controlling contactor 41, it will be apparent that in some cases, for example, where small load currents only are involved, the electromagnetic device 10 may itself serve as the load circuit controlling contactor, in which case the contacts 33 and 34 may be interposed directly in circuit with the generator and the battery and a suitable interlock provided for controlling the resistance 65.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim is new and desire to secure by Letters Patent of the United States:

1. The combination with a generator, a battery, and normally open switch means for connecting said generator to said battery, of electromagnetic means for effecting closure of said switch means comprising a magnetizable frame having opposed pole pieces, a magnetizable core normally biased to engage one of said pole pieces and movable toward a second one of said pole pieces to effect closure of said switch means, a single winding energizable in accordance with the voltage of said generator for producing a magnetic flux in said frame, said frame and said core being so arranged that the magnetic flux from said single winding exerts opposing magnetic forces on said core, one of said forces being predominating and constituting a holding force tending to maintain said core in engagement with said one pole piece and the other of said forces constituting an operating force tending to move said core toward said second pole piece, and a differential winding energizable in accordance with the difference between the generator voltage and the battery voltage for augmenting said holding force so long as said generator voltage is less than said battery voltage to prevent movement of said core by said operating force, and for opposing said holding force when said generator voltage exceeds said battery voltage, whereupon said operating force moves said core to effect closure of said switch means whenever said generator voltage exceeds said battery voltage by a predetermined amount.

2. The combination with a generator, a battery, and an electroresponsive switch for connecting said generator to said battery, of relay means for controlling the energization of said electroresponsive switch comprising a magnetizable frame having opposed pole pieces, a magnetizable core movable between said pole pieces, contacts controlled by said core, means normally biasing said core and said contacts to an open circuit position in which said core engages one of said pole pieces, said core being movable toward a second one of said pole pieces to close said contacts, a single winding energizable in accordance with the voltage of said generator for producing a magnetic flux in said frame, said frame and said core being so arranged that the magnetic flux from said single winding exerts opposing magnetic forces on said core, one of said forces being predominating and constituting a holding force tending to maintain said core in its open circuit position and the other of said forces constituting an operating force tending to move said core to close said contacts, and a differential winding energizable in accordance with the difference between the generator voltage and the battery voltage for producing a cooperating magnetic flux in said frame which augments said holding force so long as said generator voltage is less than said battery voltage to prevent closure of said relay contacts and which opposes said holding force when said generator voltage exceeds said battery voltage, said operating force thereupon moving said core to close said relay contacts and energize said switch whenever said generator voltage exceeds said battery voltage a predetermined amount.

3. The combination with a generator, a battery, and normally open switch means for connecting said generator and said battery, of electromagnetic means for effecting closure of said switch means comprising a substantially rectangular magnetizable frame having pole pieces extending inwardly from the opposite ends thereof, a magnetizable member extending across said frame intermediate said ends having an aperture in alignment with said pole pieces, a magnetizable core biased into engagement with one of said pole pieces and movable through said aperture toward a second one of said pole pieces to effect closure of said switch means, a winding surrounding said second pole piece energizable in accordance with the voltage of said generator for producing in said pole pieces opposing magnetic fluxes, one of which tends to move said core toward said second pole piece and the other of which holds said core in engagement with said one pole piece, and a differential winding surrounding said one pole piece, energizable in accordance with the difference between the generator voltage and the battery voltage for producing a magnetic flux in said one pole piece in a direction to augment said holding flux so long as said generator voltage is less than said battery voltage, and in a direction to oppose said holding flux when said generator voltage exceeds said battery voltage, whereby said holding flux is decreased and said magnetic flux in said second pole piece effects movement of said core toward said second pole piece to effect closure of said switch means whenever said generator voltage exceeds said battery voltage a predetermined amount.

4. The combination with a generator, a battery, and electroresponsive switch means for connecting said generator to said battery, of relay means for controlling the energization of said electroresponsive switch comprising a substantially rectangular magnetizable frame having pole pieces extending inwardly from the opposite ends thereof, a magnetizable member extending across said frame intermediate said ends having an aperture in alignment with said pole pieces, a magnetizable core movable through said aperture between said pole pieces, contacts controlled by said core, means normally biasing said core and said contacts to an open circuit position in which said core engages one of said pole pieces, said core being movable toward a second one of said pole pieces to close said contacts, a winding surrounding said second pole piece energizable in accordance with the voltage of said generator for producing opposing magnetic fluxes in said pole pieces, the flux through said one pole piece serving to hold said core in engagement therewith, and the flux through said second pole piece tending to move said core, and a differential winding surrounding said one pole piece energizable in accordance with the difference between the generator voltage and the battery voltage for producing a magnetic flux in said one pole piece in a direction to augment said holding flux to prevent closure of said relay contacts so long as said generator voltage is less than said battery voltage, said flux produced by said differential winding being in a direction to oppose said holding flux when said generator voltage exceeds said battery voltage whereby said holding flux is decreased and said flux in said second pole piece operates said core to close said relay contacts and energize said switch whenever said generator voltage exceeds said battery voltage by a predetermined amount.

5. The combination with a generator, a battery, and an electroresponsive switch for connecting the generator to the battery, of relay means comprising contacts for controlling the energization of said switch, a magnetizable frame having opposed pole pieces, a magnetizable plunger normally biased to engage one of said pole pieces and movable toward the other pole piece to close said contacts, means including voltage responsive windings associated with said magnetizable frame for operating said plunger to close said contacts when the voltage of said generator exceeds the voltage of said battery whereby said switch is energized to connect said generator and said battery, and means including a series winding through which said plunger is movable for exerting a force on said plunger in a direction to open said contacts and deenergize said switch in response to a reversal of the current flow therein, and for holding said plunger in said open circuit position until said switch opens regardless of the magnitude of the reverse current.

6. The combination with a generator, a battery, and an electroresponsive switch for connecting the generator to the battery, of relay means comprising contacts for controlling the energization of said switch, a magnetizable frame having opposed pole pieces, a magnetizable plunger normally biased to engage one of said pole pieces and movable toward the other pole piece to close said contacts, means including voltage responsive windings associated with said magnetizable frame for operating said plunger to close said contacts when the voltage of said generator exceeds the voltage of said battery whereby said switch is energized to connect said generator and said battery, and a series coil surrounding said plunger between said pole pieces energizable upon closure of said switch means for exerting a centering action on said plunger in response to a flow of reverse current of sufficient magnitude to overcome the magnetic flux produced by said voltage responsive windings, said plunger including a portion of reduced cross-section adjacent one end whereby said centering action operates said plunger in a direction to open said contacts and deenergize said switch, said series coil serving to hold said plunger in said open circuit position until said switch opens regardless of the magnitude of the reverse current.

7. The combination with a generator, a battery, and an electroresponsive switch for connecting said generator to said battery, of relay means for controlling the energization of said electroresponsive switch comprising a magnetizable frame having opposed pole pieces, a magnetizable core movable between said pole pieces, contacts controlled by said core, means normally biasing said core and said contacts to an open circuit position in which said core engages one of said pole pieces, said core being movable toward a second one of said pole pieces to close said contacts, a single winding energizable in accordance with the voltage of said generator for producing a magnetic flux in said frame, said frame and said core being so arranged that the magnetic flux from said single winding exerts opposing magnetic forces on said core, one of said forces being predominating and constituting a holding force tending to maintain said core in its open circuit position and the other of said forces constituting an operating force tending to move said core to close said contacts, a differential winding energizable in accordance with the difference between the generator voltage and the battery voltage for producing a cooperating magnetic flux in said frame which augments said holding force so long as said generator voltage is less than said battery voltage to prevent closure of said relay contacts and which opposes said holding force when said generator voltage exceeds said battery voltage, said operating force thereupon moving said core to close said relay contacts and energize said switch whenever said generator voltage exceeds said battery voltage a predetermined amount, and a series winding in series circuit relation with said switch for producing a magnetic flux to assist said operating force in holding said movable core in its closed circuit position so long as current flows from said generator to said battery, and for producing a magnetic force in opposition to said operating force upon a reversal of the current flow therein to move said core to its biased position whereby said switch is deenergized, said series winding and said core being so arranged that the magnetic flux from said series winding is effective upon operation of said core to said biased position to hold said core in said biased position until said switch opens, regardless of the magnitude of the reverse current.

HAROLD F. WILSON.